United States Patent [19]
Tsai et al.

[11] Patent Number: 6,101,076
[45] Date of Patent: Aug. 8, 2000

[54] ELECTROMAGNETIC SAFETY ENHANCEMENT CIRCUIT FOR UNIVERSAL SERIAL BUS SYSTEMS

[75] Inventors: Edward Tsai, Taipei; Roger Chen, Hsinchu; Dean Jau, Miao-Li Hsien, all of Taiwan

[73] Assignee: Novatek Microelectronics Corp., Hsinchu, Taiwan

[21] Appl. No.: 09/178,251

[22] Filed: Oct. 23, 1998

[30] Foreign Application Priority Data

Jul. 28, 1998 [TW] Taiwan ................... 87114974

[51] Int. Cl.[7] ...................... H02H 1/00
[52] U.S. Cl. ................. 361/90; 361/18; 361/58; 361/115; 361/119
[58] Field of Search ............... 361/90, 18, 78, 361/58, 118, 115, 119; 439/79

[56] References Cited

U.S. PATENT DOCUMENTS

| | | | |
|---|---|---|---|
| 5,953,206 | 9/1999 | Jondrow | 361/687 |
| 5,954,523 | 9/1999 | Babcocl | 439/79 |

*Primary Examiner*—Stephen W. Jackson
*Attorney, Agent, or Firm*—J. C. Patents; Jiawei Huang

[57] ABSTRACT

An electromagnetic safety (EMS) enhancement circuit is provided for a USB (Universal Serial Bus) system, which can simulate an unplugging and replugging action so as to ensure continuous operation of the USB device after being disconnected from the USB interface due to electromagnetic interferences. The EMS enhancement circuit utilizes an EMS detection unit to detect the EMS condition of the data communication between the USB device and the USB interface; if abnormal, the EMS detection unit will output an overflow signal to a resume-control unit. The resume-control unit can output a pull-up control signal to a voltage pull-up circuit so as to control the voltage pull-up circuit in such a manner that, when the USB device is disconnected from the USB interface, the voltage pull-up circuit is first inhibited from outputting a voltage signal to one data line of the USB interface to thereby simulate an unplugging action and, after a preset time, be enabled again to output the voltage signal to thereby simulate a replugging action. The simulated unplugging and replugging action can then automatically reconnect the USB device to the USB interface for continuous operation of the USB device.

16 Claims, 4 Drawing Sheets

ELECTROMAGNETIC SAFETY ENHANCEMENT CIRCUIT FOR UNIVERSAL SERIAL BUS SYSTEMS

CROSS-REFERENCE TO RELATED APPLICATION

This application claims the priority benefit of Taiwan application serial no. 87114974, filed Jul. 28, 1998, the full disclosure of which is incorporated herein by reference.

BACKGROUND OF THE INVENTION

1. Field of the Invention

This invention relates to computers, and more particular, to an electromagnetic safety (EMS) enhancement circuit for a USB (which is acronym for Universal Serial Bus) system, which can, in the event of the USB device being disconnected from the USB interface due to electromagnetic interferences, simulate an unplugging and replugging action for the USB device so as to reconnect the USB device to the USB interface to ensure continuous operation.

2. Description of Related Art

Ever since the IBM Corporation introduced the PC/XT and PC/AT models of personal computers (PC), the IBM-compatible PCs have become the most popular computer systems around the world. A PC is typically designed for use with a variety of peripheral devices to increase the capabilities of the PC. These peripheral devices include, for example, keyboards, printers, mice, modems, external drive systems, external backup systems, scanners, joysticks, to name just a few.

Some peripheral devices can be connected via the standard RS-232 serial port or the parallel port to the PC, and some others may require the installation of special interface cards, such as SCSI (Small Computer System Interface) cards, in the PC. Scanners, in particular, require a dedicated interface card for connection to the PC. In the multimedia age, almost all of the above-mentioned peripheral devices are indispensable to the PC users. Therefore, when a user wishes to connect a great variety of peripheral devices to the PC, the user must first install the associated interface cards, if required, in the expansion slots in the PC, and then connect them via respective cables to the peripheral devices. This practice, however, usually creates a huge twisted body of cables in the back of the PC, which is not only difficult to handle but also makes the office room quite messy.

As a solution to the foregoing problem, the Intel Corporation has introduced a new technology called USB (which is acronym for Universal Serial Bus) which allows the various peripheral device to be connected to the PC through a single, general-purpose port. The peripheral devices that are specifically designed for use with the USB are referred to as USB devices in this specification. The USB also supports Plug and Play (PnP) which allows the PC to automatically configure itself to work with a certain peripheral device right after the peripheral device is plugged into the USB interface. Moreover, the USB support hot plugging which allows a peripheral device to be plugged into the USB interface while the PC is powered on without having to first turn off the PC. When he peripheral device is unplugged, the PC can automatically detect this condition and uninstall all the related drives. These features make the peripheral devices more convenient to use with the PC.

One drawback to USB devices, however, is that they can easily fail the EMS (electromagnetic safety) test due to the reason that the USB system performs data communication with the PC at a transmission rate of 1.5 Mbps or 12 Mbps (megabits per second), which is significantly higher than non-USB devices, thus making the USB devices highly susceptible to electromagnetic interferences. When a certain USB device fails to transmit data correctly for a preset number of times, for example 3, the USB interface will disconnect that USB device. To resume operation, the user needs to manually unplug the USB device from the USB interface and then replugged it again to the USB interface. This practice, however, is unacceptable during the EMS test.

FIG. 1 is a schematic block diagram showing a conventional EMS circuit used in a USB system. As shown, the USB system includes a USB interface 10 and a USB device 12 connected via a cable 14 to the USB interface 10. By specification, the USB interface 10 is provided with a power line $V_{CC}$, a data line D+, a complementary data line D−, and a ground line GND. The data line D+ is used to transfer a stream of output data from the USB device 12 to the USB interface 10, while the complementary data line D− is used to transfer the complement of the data being transferred through the data line D+ for data checking purpose by the USB interface 10 to ensure correct data transmission. In addition, the USB interface 10 can use the data lines D+, D− to detect whether the USB device 12 is a high-speed peripheral device or a low-speed one. Further, the USB interface 10 uses the power and ground lines $V_{CC}$, GND to supply power to the USB device 12. The cable 14 is constructed on a double-shield structure that allows the data transmission therethrough to be immune to electromagnetic interferences.

The power from the power and ground lines $V_{CC}$, GND is transmitted through an inductance-capacitance circuit (LC circuit) consisting of two bead inducters L1, L2 and two capacitors C1, C2. The first inductor L1 has one end connected to the power line $V_{CC}$ and the other end connected to the USB controller 16; and the second inductor L2 has one end connected to the ground line GND and the other end connected to the USB controller 16. The first capacitor C1 is connected across the input ends of L1, L2; and the second capacitor C2 is connected across the output ends of L1, L2. The first capacitor C1 has a capacitance of about 0.1 $\mu$F. When powered on, the USB controller 16 can generate an output data signal with a high-voltage logic state of 3.3 V, which is then transferred via the resistor R1 to the data line D− and also fed back to the USB controller 16. The resistor R1 is, for example, 1.5 k$\Omega$ in resistance. In the case of the USB device 12 being a low-speed peripheral device, the output data signal from the USB controller 16 is transferred to the data line D−; whereas, in the case of a high-speed one, the output data signal is transferred to the data line D+.

One drawback to the conventional EMS provisions in the foregoing USB system, however, is that the double-shield structured cable and the LC circuit are both quite costly to use since this kind of cable is complex in structure and thus difficult to manufacture and the LC circuit requires a number of inductors and capacitors to implement. Moreover, the USB devices can still easily fail the EMS test.

SUMMARY OF THE INVENTION

It is therefore an objective of the present invention to provide an EMS enhancement circuit, which can help enhance the EMS of a USB device through a simulated unplugging and replugging action.

In is another objective of the present invention to provide an EMS enhancement circuit for USB systems, which can help allow the use of the peripheral devices, such as keyboards and mice, to be more cost-effective.

In accordance with the foregoing and other objectives of the present invention, an EMS enhancement circuit for USB systems is provided.

The EMS enhancement circuit is designed for use in a USB system including a USB interface and at least one USB device connected via a cable to the USB interface, with the USB interface having a first data line, a second data line, a power line, and a ground line which are connected via the cable to the USB device. The EMS enhancement circuit of the invention includes an EMS detection unit for detecting the EMS condition of the data communication between the USB device and the USB interface. The EMS detection unit generates an overflow signal when the detected EMS condition is abnormal. A resume-control unit receives the overflow signal and a reset signal as input signals and, in response, can generate a pull-up, control signal to a voltage pull-up circuit. The EMS enhancement circuit operates in such a manner that the voltage pull-up circuit is inhibited from outputting a voltage signal to the second data line of the USB interface to simulate an unplugging action when the pull-up control signal is set to an inhibiting logic state, and enabled to output the voltage signal to simulate a replugging action when the pull-up control signal is set to an enabling logic state. The simulated unplugging and replugging action can then automatically reconnect the USB device to the USB interface for continuous operation of the USB device.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

In accordance with the invention, two preferred embodiments are disclosed in the following. In these two preferred embodiments, a low-speed USB device is connected to the USB system. However, as mentioned in the background section of this specification, the connection of a low-speed peripheral device to the USB system differs from that of a high-speed one only in the different arrangement of the connection data signal to the data line D+. Therefore, in the claims, the data line D+ is broadly recited as a first data line while the complementary data line D− is broadly recited as a second data line.

First Preferred Embodiment

Figure 2:
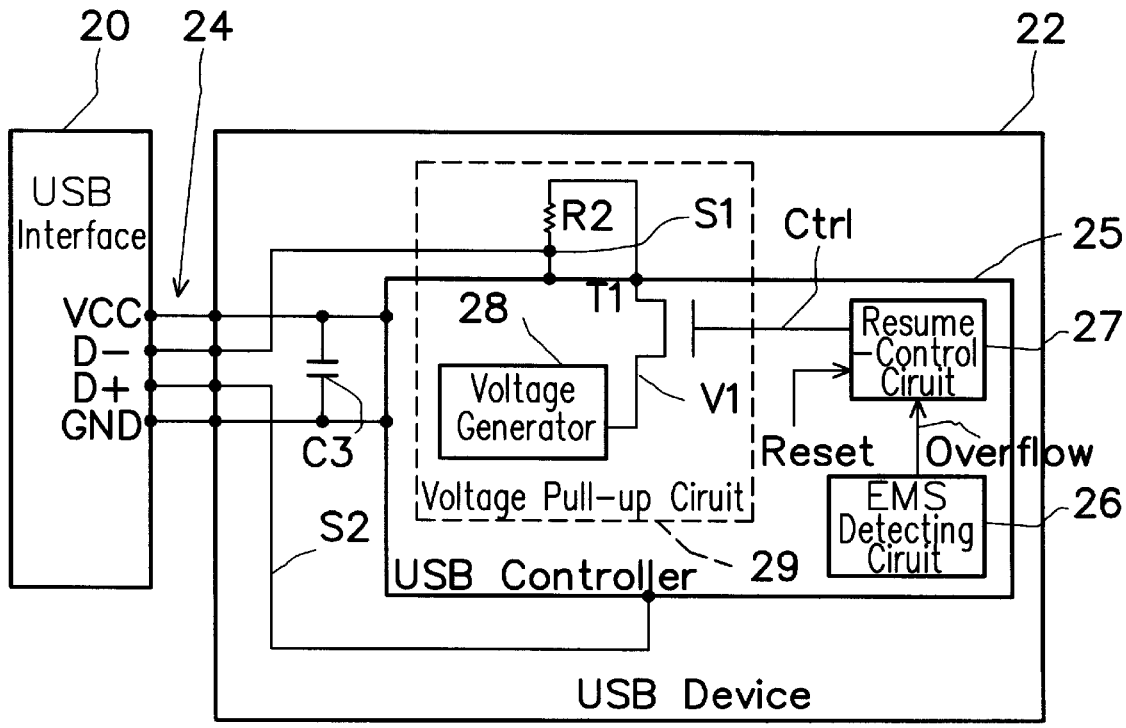
FIG. 2 is a schematic block diagram of a USB system utilizing the first preferred embodiment of the EMS enhancement circuit according to the invention.

FIG. 2 is a schematic block diagram of a USB system utilizing the first preferred embodiment of the EMS enhancement circuit according to the invention.

Figure 1:
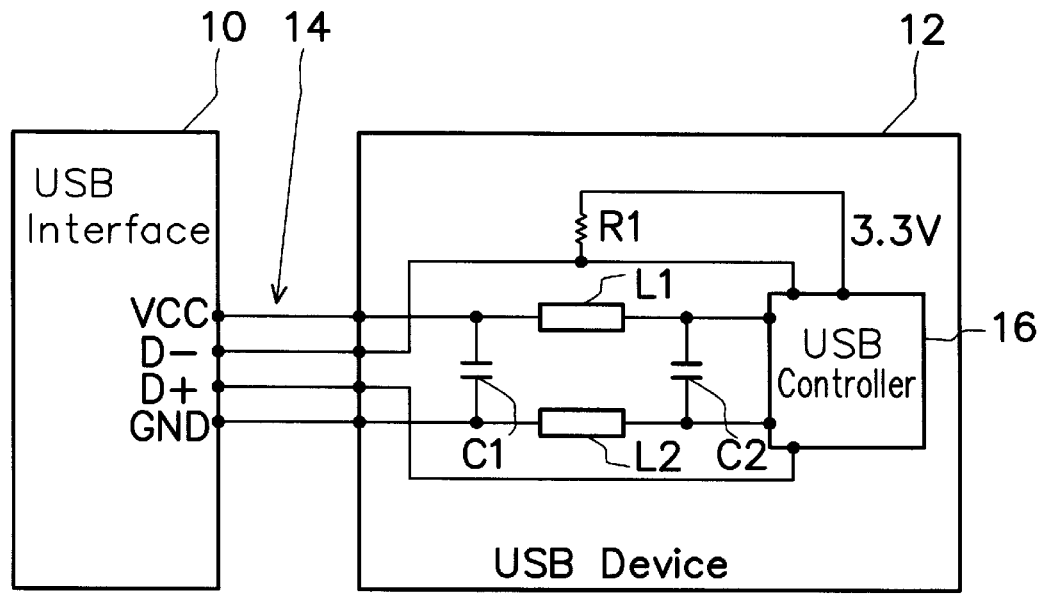
FIG. 1 is a schematic block diagram of a USB system utilizing conventional means to ensure the EMS of a USB device.

As shown, the USB system includes a USB interface 20 and a USB device 22 connected via a cable 24 to the USB interface 20. By specification, the USB interface 20 is provided with a power line $V_{CC}$, a data line D+, a complementary data line D−, and a ground line GND. These lines are entirely identical in functionality as those depicted in the prior art of FIG. 1, so detailed description thereof will not be repeated. It is a characteristic feature of the invention that, with the USB system being provided with the EMS enhancement circuit of the invention, the cable 24 can be a single-shield structured cable rather than the high-cost double shield structured cable used in the prior art of FIG. 1. The reason for this will be given later in this section.

The USB device 22 includes a USB controller 25 which is provided in accordance with the invention with an EMS detection unit 26, a resume-control unit 27, a transistor T1, and a voltage source 28. The USB controller 25 is driven by the power received from the power and ground lines $V_{CC}$, GND. A capacitor C3, which is about 0.1 $\mu$F in capacitance, is connected across the power and ground lines $V_{CC}$, GND at the input end of the USB controller 25. When powered on, the USB controller 25 will output and transfer a first data signal S1 via a resistor R2 to the complementary data line D− and a second data signal S2 directly to the data line D+. The second data signal S2 is the complement of the first data signal S1. Moreover, the voltage source 28, the transistor T1, and the resistor R2 in combination constitute a voltage pull-up circuit, as the circuit part enclosed within the dashed box indicated by the reference numeral 29 in FIG. 2.

The EMS detection unit 26 is used to detect the EMS level of the USB device 22; if abnormal, the EMS detection unit 26 will generate and transfer an overflow signal to the resume-control unit 27. The resume-control unit 27 receives the overflow signal and a reset signal as input signals. In response to these input signals, the resume-control unit 27 generates and transfers a pull-up control signal Ctrl to the gate of the transistor T1 in the voltage pull-up circuit 29. If the pull-up control signal Ctrl is set at an enabling logic state, the transistor T1 will be switched to conducting state (ON), allowing the output of the voltage pull-up circuit 29 to take on the output voltage V1 from the voltage source 28 as the first data signal S1 which is then transferred to the complementary data line D−. This signal is used to simulate an unplugging and replugging action so as to reconnect the USB device 22 to the USB interface 20 after being disconnected due to electromagnetic interferences.

In the voltage pull-up circuit 29, if the output voltage V1 from the voltage source 28 is 3.3 V, the resistance of the resistor R3 is 1.5 K$\Omega$; and if 5 V, the resistance of the resistor R3 is 7.5 K$\Omega$.

In this embodiment, the voltage pull-up circuit 29 can detect whether the USB device 22 is functionally connected to the USB interface 20. During operation of the USB device 22, the EMS detection unit 26 repeatedly detects whether the data communication between the USB device 22 and the USB interface 20 is normal or abnormal. If abnormal, the EMS detection unit 26 will generate an overflow signal to activate the resume-control unit 27 to control the voltage pull-up circuit 29 in such a manner as to simulate an unplugging and replugging action so as to reconnect the USB device 22 to the USB interface 20.

Second Preferred Embodiment

Figure 3:
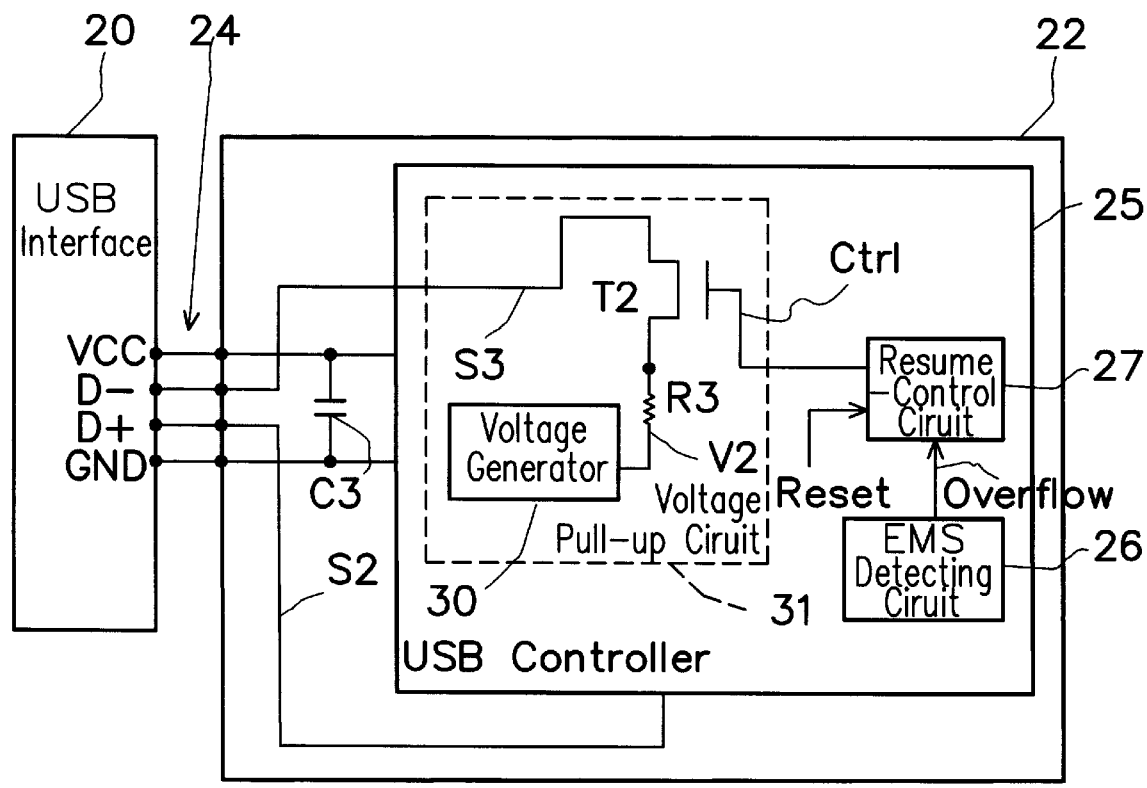
FIG. 3 is a schematic block diagram of a USB system utilizing the second preferred embodiment of the EMS enhancement circuit according to the invention.

FIG. 3 is a schematic block diagram of a USB system utilizing the second preferred embodiment of the EMS enhancement circuit according to the invention. This embodiment differs from the previous one day only in that the voltage pull-up circuit, here designated by the reference numeral 31, is different in inside structure from the voltage pull-up circuit 29 shown in FIG. 2. Beside this, all the other constituent elements are identical to those used in the first embodiment of FIG. 2 and are thus labeled with the same reference numerals.

As shown, the voltage pull-up circuit 31 used here is composed of a voltage source 30 for generating an output voltage V2; a resistor R3 connected in series to the output of the voltage source 30; and a switching device, such as a transistor T2, whose ON/OFF state is controlled by the pull-up control signal Ctrl from the resume-control unit 27, and which has an input end connected to the resistor R3 and an output end connected directly to the complementary data line D−. When the transistor T2 is switched to the conducting state (ON), it will allow the output end to take on the output voltage V2 from the voltage source 30 via the resistor R3.

In the voltage pull-up circuit 31, if the output voltage V2 from the voltage source 30 is 3.3 V, the resistance of the resistor R3 is 1.5 KΩ; and if 5 V, the resistance of the resistor R3 is 7.5 KΩ.

In this embodiment, the voltage pull-up circuit 31 can detect whether the USB device 22 is functionally connected to the USB interface 20. During operation of the USB device 22, the EMS detection unit 26 repeatedly detects whether the data communication between the USB device 22 and the USB interface 20 is normal or abnormal. If abnormal, the EMS detection unit 26 will generate an overflow signal to activate the resume-control unit 27 to control the voltage pull-up circuit 31 in such a manner as to simulate an unplugging and replugging action so as to reconnect the USB device 22 to the USB interface 20.

Figure 4:
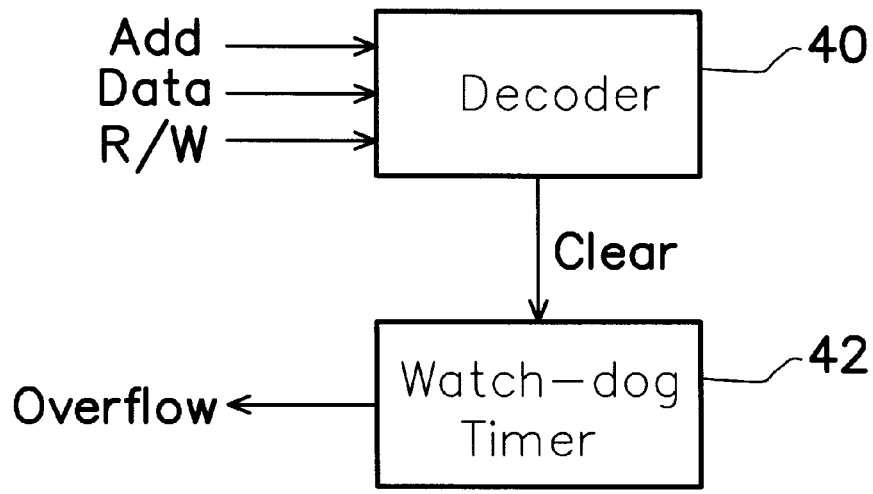
FIG. 4 is a schematic block diagram of the inside structure of the EMS detection unit used in the EMS enhancement circuit of the invention.

FIG. 4 is a schematic block diagram of the inside structure of the EMS detection unit 26 used in the EMS enhancement circuit of the invention. As shown, the EMS detection unit 26 includes a decoder 40 and a watch-dog timer 42. The decoder 40 receives an address signal Add, a data signal Data, and a read/write request signal R/W signal from the data communication between the USB device 22 and the USB interface 20 as input signals and checks whether these signals are correct. If correct, the decoder 40 outputs a clear signal Clear to the watch-dog timer 42 to reset the watch-dog timer 42 to zero. The watch-dog timer 42 operates in such a manner that when a preset time has elapsed without being reset to zero by the appearance of the clear signal from the decoder 40, it will output an overflow signal Overflow.

Figure 5:
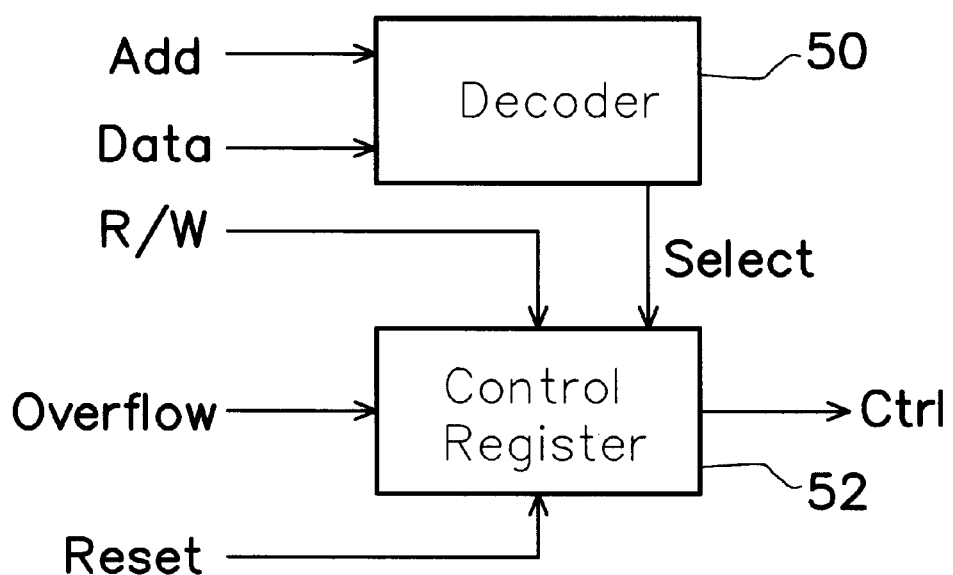
FIG. 5 is a schematic block diagram of the inside structure of the resume-control unit used in the EMS enhancement circuit of the invention.

FIG. 5 is a schematic block diagram of the inside structure of the resume-control unit 27 used in the EMS enhancement circuit of the invention. As shown, the resume-control unit 27 includes a decoder 50 and a control register 52. The decoder 50 receives the address signal Add and the data signal Data from the data communication between the USB interface 20 and the USB device 22 as input signals (which are also the input signals to the decoder 40 in the EMS detection unit 26); and in response to these input signals, the decoder 50 outputs a selection signal Select to the control register 52. The control register 52 takes the selection signal Select from the decoder 50, the overflow signal Overflow from the watch-dog timer 42, and the read/write request signal R/W as input signals; and in response to these input signals, the control register 52 generates a pull-up control signal Ctrl.

In the first preferred embodiment, the pull-up control signal Crtl is used to control the ON/OFF state of the transistor T1 in the voltage pull-up circuit 29; and in the second preferred embodiment, it is used to control the ON/OFF state of the transistor T2 in the voltage pull-up circuit 31. The control is performed in such a manner that when the watch-dog timer 42 outputs an overflow signal Overflow, the resume-control unit 27 will set the pull-up control signal Ctrl to the inhibiting logic state, thus inhibiting the voltage pull-up circuit 29/31 to perform the voltage pull-up action. Otherwise, the resume-control unit 27 will set the pull-up control signal Ctrl to the enabling logic state, thus enabling the voltage pull-up circuit 29/31 to perform the voltage pull-up action.

Figure 6:
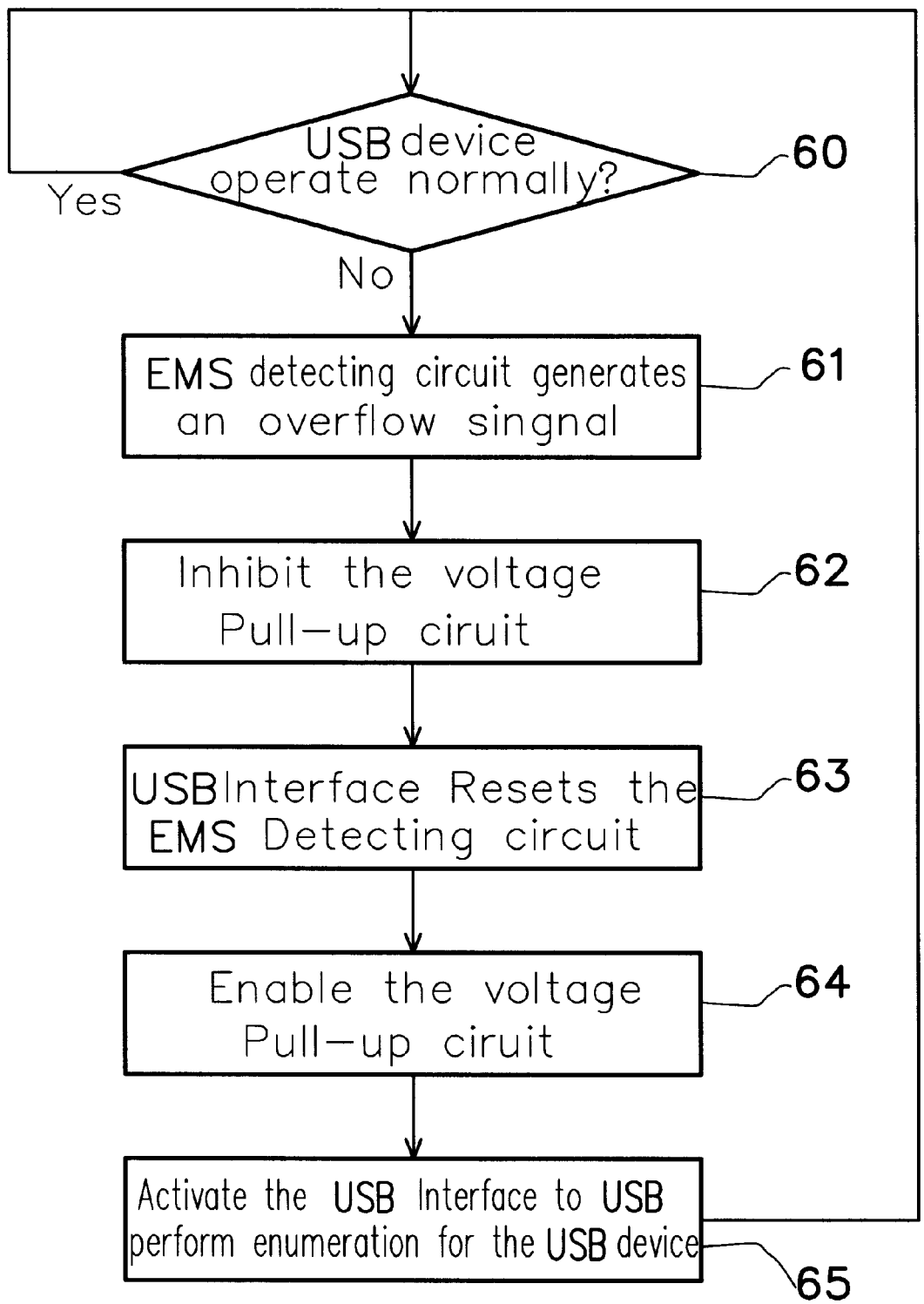
FIG. 6 is a flow diagram showing the procedural steps involved in an EMS test performed by the EMS enhancement circuit of the invention to test the EMS of the USB device.

FIG. 6 is a flow diagram showing the procedural steps involved in an EMS test performed by the EMS enhancement circuit of the invention to test the EMS of the USB device 22.

As shown, in the initial step 60, the EMS enhancement circuit checks whether the data communication between the USB interface 20 and the USB device 22 is normal or abnormal due to electromagnetic interferences. If normal, the EMS enhancement circuit will continue the checking repeatedly; otherwise, if abnormal, the procedure goes to the step 61. When the USB device 22 is subjected to electromagnetic interferences, the data communication between the USB device 22 and the USB interface 20 will be interfered to cause the address signal Add, the data signal Data, or the read/write request signal R/W to be corrupted. Any of these conditions will cause the procedure to jump to step 61.

In the step 61, the EMS enhancement circuit activates the EMS detection unit 26 to output an overflow signal. The procedure then goes to the step 62.

In the step 62, the resume-control unit 27 sets the pull-up control signal Crtl to the inhibiting logic state, thus inhibiting the output of the voltage pull-up circuit 29/31 to simulate an unplugging action. After this, the procedure goes to the step 63.

In the step 63, after a predetermined time after the unplugging action is performed, the USB interface 20 is reset and the EMS detection unit 26 is reactivated to repeat checking the EMS condition of the USB device 22. The procedure then goes to step 64.

In the step 64, the resume-control unit 27 sets the pull-up control signal Crtl to the enabling logic state, thus enabling the output of the voltage pull-up circuit 29/31 to simulate a plugging action. After this, the procedure goes to the step 65.

In the step 65, the USB interface 20 performs enumeration for the USB device 22 to thereby reconnect the USB device 22 back to normal operation. The procedure then returns to the step 60.

In conclusion, the EMS enhancement circuit of the invention is characterized in that it can simulate an unplugging and replugging action after the USB device is disconnected from the USB interface due to electromagnetic interferences so as to allow the USB device to be automatically reconnected to the USB interface.

Moreover, the EMS enhancement circuit of the invention is characterized in that the use of the simulated unplugging and replugging action allows the USB device to be connected to the USB interface via a single-shield structured cable, thus allowing the utilization of the USB system to be reduced in cost as compared to the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An EMS enhancement circuit for use in a USB system including a USB interface and at least one USB device connected via a cable to the USB interface, with the USB interface having a first data line, a second data line, a power line, and a ground line which are connected via the cable to the USB device;

the EMS enhancement circuit comprising:
a capacitor connected across the power and ground lines;
an EMS detection unit for detecting the EMS condition of the data communication between the USB device and the USB interface; the EMS detection unit generating an overflow signal when the detected EMS condition is abnormal;
a resume-control unit, which receives the overflow signal and a reset signal as input signals, for generating a pull-up control signal in response to the overflow signal and the reset signal; and
a voltage pull-up circuit which is controlled by the pull-up control signal from the resume-control unit in such a manner that the voltage pull-up circuit is inhibited from outputting a voltage signal to the second data line of the USB interface to simulate an unplugging action when the pull-up control signal is set to an inhibiting logic state, and enabled to output the voltage signal when the pull-up control signal is set to an enabling logic state.

2. The EMS enhancement circuit of claim 1, wherein the voltage pull-up circuit includes:
a voltage source for generating an output voltage, and;
a switching device for transferring the output voltage of the voltage source to an output end when switched to ON state, and whose ON/OFF state is under control by the pull-up control signal from the resume-control unit in such a manner that when the pull-up control signal is set to the enabling logic state, the switching device is switched to ON state to allow the output voltage from the voltage source to pass therethrough to the output end, and when the pull-up control signal is set to the inhibiting logic state, the switching device is switched to OFF state to inhibit the output voltage from the voltage pull-up circuit.

3. The EMS enhancement circuit of claim 1, wherein the voltage pull-up circuit includes:
a voltage source for generating an output voltage;
a resistor having one end connected in series to the output of the voltage source; and
a switching device having an input end connected to the resistor and an output end connected to the second data line of the USB interface, and whose ON/OFF state is under control by the pull-up control signal from the resume-control unit in such a manner that when the pull-up control signal is set to the enabling logic state, the switching device is switched to ON state to allow the output end to take on the output voltage from the voltage source via the resistor, and when the pull-up control signal is set to the inhibiting logic state, the switching device is switched to OFF state to inhibit the output of the voltage pull-up circuit.

4. The EMS enhancement circuit of claim 2, wherein in the case that the output voltage from the voltage source is 3.3 V, the resistor is 1.5 KΩ in resistance.

5. The EMS enhancement circuit of claim 2, wherein in the case that the output voltage from the voltage source is 5 V, the resistor is 7.5 KΩ in resistance.

6. The EMS enhancement circuit of claim 3, wherein in the case that the output voltage from the voltage source is 3.3 V, the resistor is 1.5 KΩ in resistance.

7. The EMS enhancement circuit of claim 3, wherein in the case that the output voltage from the voltage source is 5 V, the resistor is 7.5 KΩ in resistance.

8. The EMS enhancement circuit of claim 1, wherein the capacitor is 0.1 $\mu$F in capacitance.

9. The EMS enhancement circuit of claim 1, wherein the EMS detection unit includes:
a decoder which receives the address signals, the data signals, and the read/write request signals in the data communication between the USB device and the USB interface as input signals and checks whether these input signals are correct, if correct, the decoder generating a clear signal; and
a watch-dog timer which can be reset by the clear signal from the decoder and operates in such a manner that when it hasn't received the clear signal continuously for a preset time without being reset by the clear signal, it will generate the overflow signal.

10. The EMS enhancement circuit of claim 1, wherein the resume-control unit includes:
a decoder which receives the address signals and the data signals in the data communication between the USB device and the USB interface as input signals and checks whether these input signals are correct; if correct, the decoder generating a selection signal; and
a control register, which receives the overflow signal from the EMS detection unit and a reset signal as input signals, for generating a logic output in response to the selection signal from the decoder to serve as the pull-up control signal.

11. An EMS enhancement circuit for use in a USB system including a USB interface and at least one USB device connected via a cable to the USB interface, with the USB interface having a first data line, a second data line, a power line, and a ground line which are connected via the cable to the USB device;

the EMS enhancement circuit comprising:
a capacitor connected across the power and ground lines;
an EMS detection unit for detecting the EMS condition of the data communication between the USB device and the USB interface; the EMS detection unit generating an overflow signal when the detected EMS condition is abnormal;
a resume-control unit, which receives the overflow signal and a reset signal as input signals, for generating a pull-up control signal in response to the overflow signal and the reset signal; and
a voltage pull-up circuit which is controlled by the pull-up control signal from the resume-control unit in such a manner that the voltage pull-up circuit is inhibited from outputting a voltage signal to the second data line of the USB interface to simulate an unplugging action when the pull-up control signal is set to an inhibiting logic state, and enabled to output the voltage signal when the pull-up control signal is set to an enabling logic state; the voltage pull-up circuit including:

a voltage source for generating an output voltage;

a switching device for transferring the output voltage of the voltage source to an output end when switched to ON state, and whose ON/OFF state is under control by the pull-up control signal from the resume-control unit in such a manner that when the pull-up control signal is set to the enabling logic state, the switching device is switched to ON state to allow the output voltage from the voltage source to pass therethrough to the output end, and when the pull-up control signal is set to the inhibiting logic state, the switching device is switched to OFF state to inhibit the output voltage from the voltage pull-up circuit; and a resistor having one end connected to the output end of the switching device and the other end connected to the second data line of the USB interface, for transferring the output voltage from the voltage source, when the switching device is switched to ON state, to the second data line.

12. The EMS enhancement circuit of claim 11, wherein in the case that the output voltage from the voltage source is 3.3 V, the resistor is 1.5 KΩ in resistance.

13. The EMS enhancement circuit of claim 11, wherein in the case that the output voltage from the voltage source is 5 V, the resistor is 7.5 KΩ in resistance.

14. The EMS enhancement circuit of claim 11, wherein the capacitor is 0.1 $\mu$F in capacitance.

15. The EMS enhancement circuit of claim 11, wherein the EMS detection unit includes:

a decoder which receives the address signals, the data signals, and the read/write request signals in the data communication between the USB device and the USB interface as input signals and checks whether these input signals are correct, if correct, the decoder generating a clear signal; and a watch-dog timer which can be reset by the clear signal from the decoder and operates in such a manner that when it hasn't received the clear signal continuously for a preset time without being reset by the clear signal, it will generate the overflow signal.

16. The EMS enhancement circuit of claim 11, wherein the resume-control unit includes:

a decoder which receives the address signals and the data signals in the data communication between the USB device and the USB interface as input signals and checks whether these input signals are correct; if correct, the decoder generating a selection signal; and a control register, which receives the overflow signal from the EMS detection unit and a reset signal as input signals, for generating a logic output in response to the selection signal from the decoder to serve as the pull-up control signal.

* * * * *